United States Patent
Ochiai et al.

(10) Patent No.: US 10,881,089 B2
(45) Date of Patent: Jan. 5, 2021

(54) SPINNING REEL

(71) Applicant: Shimano Inc., Osaka (JP)

(72) Inventors: Koji Ochiai, Osaka (JP); Motohiro Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/539,788

(22) Filed: Aug. 13, 2019

(65) Prior Publication Data
US 2020/0085025 A1    Mar. 19, 2020

(30) Foreign Application Priority Data

Sep. 14, 2018 (JP) ................................. 2018-172543

(51) Int. Cl.
*A01K 89/01* (2006.01)
*A01K 91/02* (2006.01)
*A01K 89/015* (2006.01)

(52) U.S. Cl.
CPC ...... *A01K 89/0108* (2013.01); *A01K 89/0111* (2013.01); *A01K 89/0183* (2015.05); *A01K 91/02* (2013.01)

(58) Field of Classification Search
CPC ............ A01K 89/0108; A01K 89/0111; A01K 89/011221
See application file for complete search history.

(56) References Cited

U.S. PATENT DOCUMENTS

| 6,227,474 B1* | 5/2001 | Okada ................ A01K 89/0108 242/150 R |
| 2002/0125358 A1* | 9/2002 | Takikura ........ A01K 89/011221 242/319 |
| 2004/0227028 A1* | 11/2004 | Nishikawa ............. A01K 89/01 242/249 |
| 2005/0082405 A1* | 4/2005 | Sugawara .......... A01K 89/0108 242/223 |

FOREIGN PATENT DOCUMENTS

| EP | 3498092 A1 * | 6/2019 | ........ A01K 89/0108 |
| JP | 2007312633 A | * 12/2007 | |
| JP | 4324462 B2 | 6/2009 | |

* cited by examiner

*Primary Examiner* — Emmanuel M Marcelo
(74) *Attorney, Agent, or Firm* — Global IP Counselors, LLP

(57) ABSTRACT

A spinning reel for casting fishing line includes a handle rotatably, a spool shaft, a spool, a rotor and a drainage hole. The spool shaft moves back and forth in accordance with rotation of the handle. The spool includes a bobbin trunk and a skirt portion in a rear portion of the bobbin trunk and has a larger diameter than the external diameter of the bobbin trunk. The rotor rotates has a wall portion with a smaller diameter than an external diameter of the skirt portion and through which the spool shaft penetrates, the rotor further including a first cylindrical portion protruding from the wall portion and at least part of which overlaps the skirt portion, and a second cylindrical portion protruding from the wall portion. The drainage hole passes from an interior to an exterior of the first cylindrical portion.

9 Claims, 3 Drawing Sheets

SPINNING REEL

CROSS-REFERENCE TO RELATED APPLICATIONS

This application claims priority to Japanese Patent Application No. 2018-172543, filed on Sep. 14, 2018. The entire disclosure of Japanese Patent Application No. 2018-172543 is hereby incorporated herein by reference.

BACKGROUND

Field of the Invention

The present invention relates to a fishing reel, more specifically, to a spinning reel that can cast a fishing line in a forward direction.

Background Art

Conventional spools generally have a bobbin trunk and a skirt portion that is provided in the rear portion of the bobbin trunk. The rotor has a wall portion through which the spool shaft penetrates, and a cylindrical portion, at least part of which overlaps the skirt portion in the radial direction on the inside of the skirt portion. The overlapping of the skirt portion and by the cylindrical portion in the radial direction prevents intrusion of the fishing line into the skirt portion as well as tangling of the fishing line with the spool shaft due to the intrusion of the fishing line (see Japanese Patent No. 4324462).

In order to prevent the intrusion of fishing line into the skirt portion of the spool by overlapping the cylindrical portion of the rotor onto part of the skirt portion in the radial direction, it is necessary to overlap part of the cylindrical portion onto the skirt portion in the radial direction, even when the spool has moved to the farthest forward position. As a result, for example, in the spinning reel in which the amount of movement of the spool in the longitudinal direction is large, the cylindrical portion is formed with a long axial length.

If the wall portion is disposed at the front end of the cylindrical portion when the cylindrical portion has a long axial length, the cylindrical portion will have a large amount of interior space, and the amount of water that can enter the cylindrical portion increases. Therefore, in Japanese Patent No. 4324462, the cylindrical portion protrudes farther forward than the wall portion. In this case, if water intrudes into the cylindrical portion and the water accumulates inside the cylindrical portion, there is the risk that the water will intrude into the reel body from the interior of the cylindrical portion.

SUMMARY

An object of the present invention is to reduce or prevent entry of water from the cylindrical portion of the rotor to the interior of the reel body, and also to prevent entry of fishing line into the skirt portion of the spool.

The spinning reel according to one aspect of the present invention can cast (unreel) the fishing line in a forward direction. The spinning reel comprises a reel body, a handle, the spool shaft, the spool, a rotor, and a drainage hole. The handle is rotatably supported by the reel body. The spool shaft moves the reel body back and forth in reciprocating fashion in accordance with the rotation of the handle. The spool moves integrally with the spool shaft. The spool has a bobbin trunk and a skirt portion that is disposed in the rear portion of the bobbin trunk and that has a larger diameter than the external diameter of the bobbin trunk. The rotor can rotate relative to the reel body. The rotor has a wall portion, which has a smaller diameter than the external diameter of the skirt portion and through which the spool shaft penetrates in the axial direction, a first cylindrical portion that protrudes forward from the wall portion and at least part of which overlaps the skirt portion of the spool in the radial direction, and a second cylindrical portion that protrudes rearward from the wall portion. The drainage hole passes from the interior to the exterior of the first cylindrical portion of the rotor.

In this spinning reel, since at least part of the first cylindrical portion of the rotor overlaps part of the skirt portion of the spool in the radial direction, intrusion of the fishing line into the skirt portion of the spool can be prevented. In addition, if water enters into the first cylindrical portion of the rotor from the front, the water that has entered into the first cylindrical portion is discharged from the drainage hole to the outside of the first cylindrical portion. Since it is thus possible to prevent or reduce the accumulation of water inside the first cylindrical portion, the intrusion of the water from the first cylindrical portion to the interior of the reel body can be prevented or reduced.

Preferably, the drainage hole extends along the circumferential direction of the first cylindrical portion. In this embodiment, it is possible to effectively and promptly discharge the water that has entered the first cylindrical portion to the outside.

Preferably, the drainage hole is formed at a boundary portion between the wall portion and the first cylindrical portion. In this embodiment, because it is possible to reduce or prevent the accumulation of the water on a front surface portion of the wall portion inside the first cylindrical portion, the intrusion of water from the first cylindrical portion to the interior of the reel body can be further reduced.

Preferably, the drainage hole has an inclined portion that is inclined rearward in a direction away from the spool shaft. In this embodiment, since the water discharged from the drainage hole is more easily directed to the outside, water is less likely to remain in the skirt portion of the spool.

Preferably, the rear end portion of the inclined portion of the drainage hole is connected to the outer peripheral portion of the second cylindrical portion. In this embodiment, the water discharged from the drainage hole is more easily directed to the outside.

Preferably, the rotor also has a pair of rotor arms that oppose each other on the radially outward side of the first cylindrical portion and the second cylindrical portion. The drainage hole is formed in a position that does not overlap the pair of rotor arms in the radial direction. In this embodiment, the water discharged from the drainage hole can be smoothly discharged to the outside without hindrance from the rotor arms.

By the present invention, it is possible to reduce or eliminate the entry of water from the cylindrical portion of the rotor to the interior of the reel body and also to prevent the intrusion of fishing line into the skirt portion of the spool.

DETAILED DESCRIPTION OF THE EMBODIMENT

Figure 1:
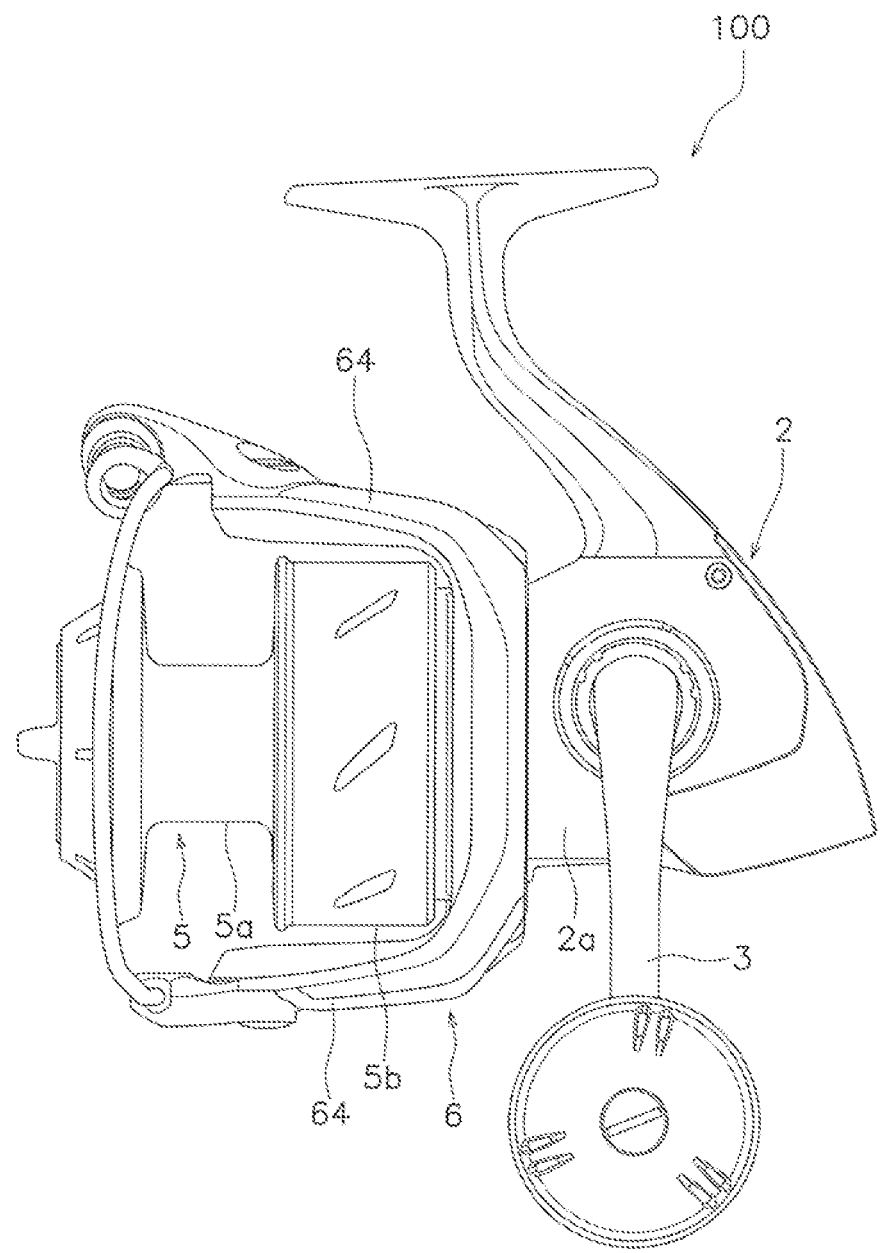
FIG. 1 is a side view of a spinning reel employing one embodiment of the present invention.

A spinning reel 100 employing one embodiment of the present invention is capable of casting a fishing line in a forward direction. FIG. 1 is a side view of the spinning reel 100. As shown in FIG. 1, the spinning reel 100 comprises a reel body 2, a handle 3, a spool shaft 4 (refer to FIG. 2), a spool 5, a rotor 6, and a drainage hole 7 (refer to FIG. 3).

In the following description, the direction in which fishing line is cast (unreeled) during fishing is referred to as the front, and the opposite direction is referred to as the rear. Furthermore, left and right mean left and right as seen from the rear of the spinning reel 100. In addition, the direction in which the spool shaft 4 extends is referred to as the axial direction, the direction orthogonal to the spool shaft 4 is referred to as the radial direction, and the direction around the axis of the spool shaft 4 is referred to as circumferential direction. The axial direction in the present embodiment coincides with the longitudinal direction.

Figure 2:
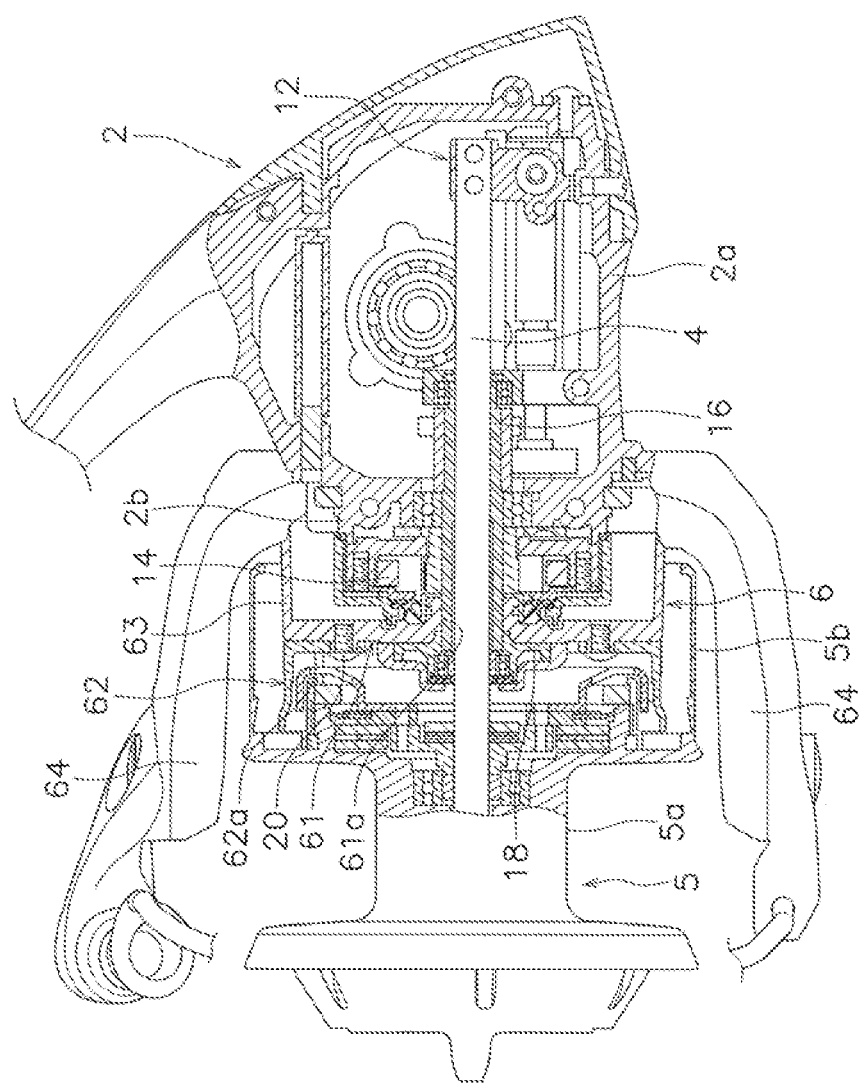
FIG. 2 is a cross-sectional view of the spinning reel.

FIG. 2 is a cross-sectional view of the spinning reel 100. The reel body 2 has a reel body portion 2a and a cylindrical portion 2b. The reel body portion 2a has an internal space which houses a known oscillating mechanism 12 and part of a known rotor drive mechanism, not shown, that drives the rotor 6. The cylindrical portion 2b extends in the axial direction from the front portion of the reel body portion 2a. A one-way clutch 14 is disposed inside the cylindrical portion 2b.

The handle 3 is rotatably supported by the reel body 2. In the present embodiment, the handle 3 is mounted on the left side of the reel body 2. The handle 3 may also be mounted on the right side of the reel body 2.

The spool shaft 4 is supported by the reel body 2, extending in the longitudinal direction. The spool shaft 4 moves the reel body 2 back and forth in reciprocating fashion by the oscillating mechanism 12 in accordance with the rotation of the handle 3.

The spool 5 is mounted on the spool shaft 4 by a nut member, not shown, that threads onto the distal end of the spool shaft 4 and integrally moves with the spool shaft 4. That is, the spool 5 moves back and forth in reciprocating fashion with respect to the reel body 2 together with the spool shaft 4. The position of the spool 5 shown in FIGS. 1 and 2 indicates the position when the spool 5 has moved farthest rearward with respect to the reel body 2.

The spool 5 has a bobbin trunk 5a and a skirt portion 5b. Fishing line is wound around the outer periphery of the bobbin trunk 5a. The skirt portion 5b is formed integrally with the bobbin trunk 5a in the rear portion of the bobbin trunk 5a. The skirt portion 5b has a cylindrical shape and extends in the axial direction. The outer diameter of the skirt portion 5b is larger than the external diameter of the bobbin trunk 5a.

The rotor 6 can rotate relative to the reel body 2 and winds the fishing line around the bobbin trunk 5a of the spool 5 in accordance with the rotation of the handle 3. The rotor 6 is connected to a pinion gear 16 to which the rotation of the handle 3 is transmitted so as to be integrally rotatable. The rotation of the handle 3 is transmitted to the pinion gear 16 via the rotor drive mechanism.

Figure 3:
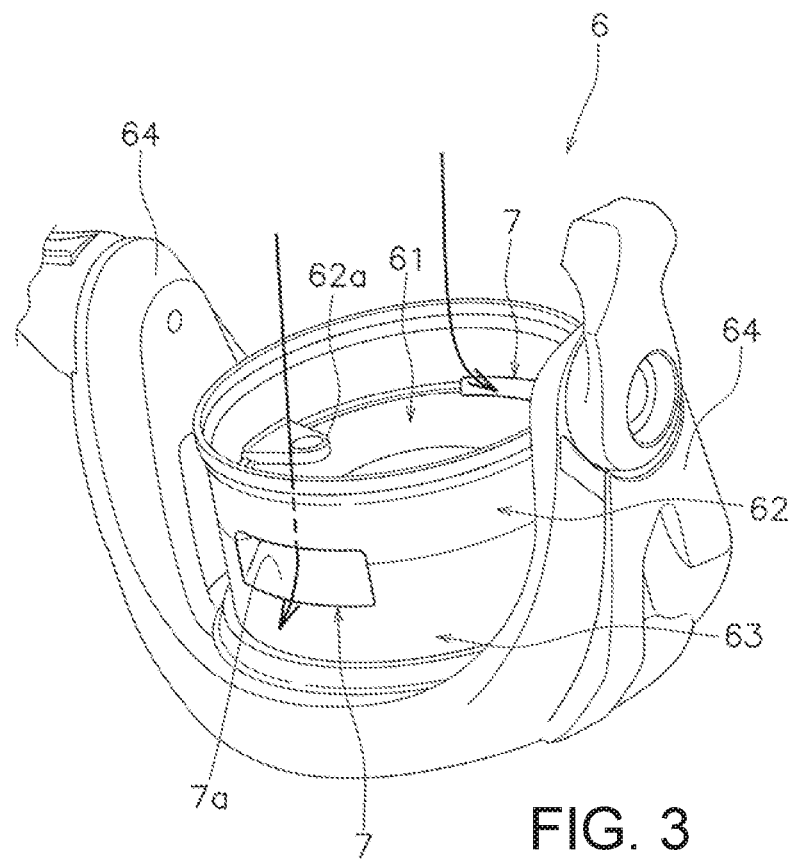
FIG. 3 is a perspective view of a rotor.
Figure 4:
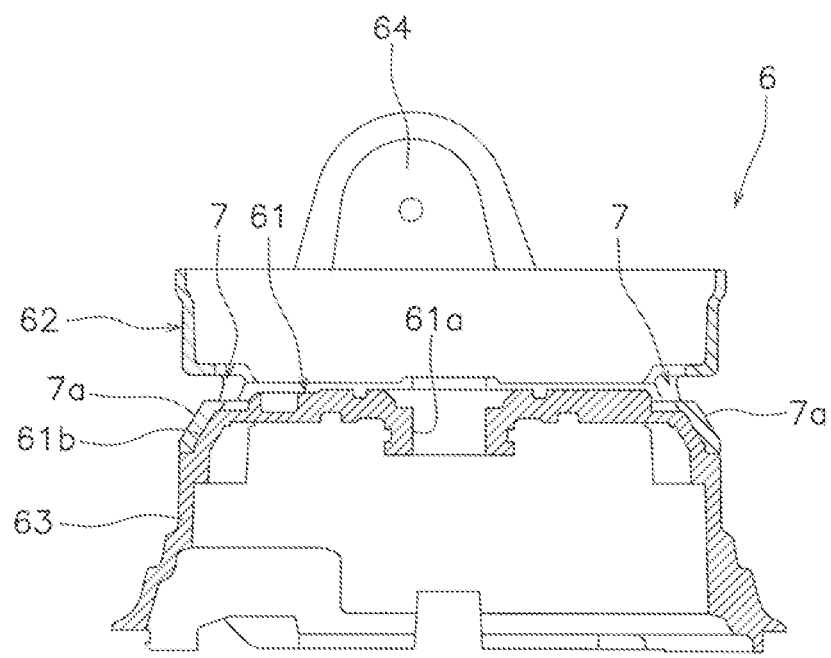
FIG. 4 is a cross-sectional view of the rotor.

FIG. 3 is a perspective view of the rotor 6. FIG. 4 is a cross-sectional view of the rotor 6. As shown in FIGS. 2 to 4, the rotor 6 has a wall portion 61, a first cylindrical portion 62, a second cylindrical portion 63, and a pair of rotor arms 64. The wall portion 61 is disk-shaped and extends in the radial direction. The wall portion 61 has a smaller diameter than the external diameter of the skirt portion 5b of the spool 5 and is disposed radially inward of the skirt portion 5b. At the center of the wall portion 61 is a through-hole 61a through which the spool shaft 4 extends in the axial direction. The wall portion 61 is connected to the pinion gear 16 so as to be integrally rotatable by a nut member 18 that threads onto the distal end of the pinion gear 16.

The first cylindrical portion 62 is cylindrical and protrudes forward from the outer end portion of the wall portion 61. Thus, the first cylindrical portion 62 is open towards the front and covered by the wall portion 61 at the rear. At least part of the first cylindrical portion 62 overlaps the skirt portion 5b of the spool 5 in the radial direction. In particular, both when the spool 5 has moved to the frontmost position with respect to the reel body 2, and when the spool 5 has moved to the rearmost position with respect to the reel body 2, at least part of the first cylindrical portion 62 overlaps the skirt portion 5b of the spool 5 in the radial direction. That is, the first cylindrical portion 62 is disposed radially inward of the skirt portion 5b of the spool 5, and at least a portion thereof is disposed facing the inner peripheral portion of the skirt portion 5b of the spool 5. As a result, the intrusion of the fishing line into the skirt portion 5b of the spool 5 can be prevented by the first cylindrical portion 62.

In the present embodiment, the first cylindrical portion 62 is a separate body from the wall portion 61. In particular, as shown in FIGS. 2 and 3, the first cylindrical portion 62 has a fixing portion 62a that protrudes radially inward from the first cylindrical portion 62. The fixing portion 62a is fixed to the wall portion 61 by means of a screw member 20. The first cylindrical portion 62 is thereby fixed to the wall portion 61.

The second cylindrical portion 63 is cylindrical and protrudes rearward from the outer end portion of the wall portion 61. Accordingly, the second cylindrical portion 63 is opened rearward, and the front is covered by the wall portion 61. The first cylindrical portion 62 is disposed radially inward of the skirt portion 5b of the spool 5. As shown in FIG. 2, at least a portion of the second cylindrical portion 63 is disposed facing the inner peripheral portion of the skirt portion 5b of the spool 5, when the spool 5 has moved to the rearmost position with respect to the reel body 2. In this embodiment, the second cylindrical portion 63 does not overlap the skirt portion 5b of the spool 5 in the radial direction when the spool 5 has moved to the frontmost position with respect to the reel body 2. However, part of the second cylindrical portion 63 can be configured to overlap the skirt portion 5b of the spool 5 in the radial direction when the spool 5 has moved to the frontmost position with respect to the reel body 2.

The second cylindrical portion 63 is integrally formed with the wall portion 61. The external diameter of the second cylindrical portion 63 is approximately the same as the external diameter of the first cylindrical portion 62. The cylindrical portion 2b of the reel body 2 is housed in the internal space of the second cylindrical portion 63.

As shown in FIGS. 1 to 3, the pair of rotor arms 64 are disposed in positions that oppose each other, radially outward of the first cylindrical portion 62 and the second cylindrical portion 63. The pair of rotor arms 64 are integrally formed with the second cylindrical portion 63. The pair of rotor arms 64 are curve forward from the rear end portion of the second cylindrical portion 63 so as to be spaced apart from the first cylindrical portion 62 and the second cylindrical portion 63 in the radial direction.

As shown in FIGS. 3 and 4, the drainage hole 7 passes from the interior to the exterior of the first cylindrical portion 62 of the rotor 6. In this embodiment, the drainage hole 7 penetrates the first cylindrical portion 62 in the radial direction at a boundary portion between the wall portion 61 and the first cylindrical portion 62. The drainage holes 7 are disposed in two opposing locations at an interval in the circumferential direction. The drainage hole 7 extends along the circumferential direction of the first cylindrical portion 62 and is disposed in a position that does not overlap the pair of rotor arms 64 in the radial direction.

The drainage hole 7 has an inclined portion 7a. The inclined portion 7a extends along the circumferential direction of the first cylindrical portion 62 and is inclined rearward in a direction away from the spool shaft 4. In this embodiment, the inclined portion 7a is integrally formed with the first cylindrical portion 62 at the rear end portion of the first cylindrical portion 62. The inclined portion 7a is disposed in a position overlapping the first cylindrical portion 62 in the axial direction. The inclined portion 7a is mounted on a mounting portion 61b that is disposed at a boundary portion between the wall portion 61 and the second cylindrical portion 63. The mounting portion 61b has a shape that corresponds to the inclined portion 7a, and is inclined rearward in a direction away from the spool shaft 4. The rear end portion of the inclined portion 7a is connected to the outer peripheral portion of the second cylindrical portion 63 in a stepless manner. That is, the inclined portion 7a is configured such that the outer circumferential surface of the rear end portion thereof is flush with the outer circumferential surface of the second cylindrical portion 63.

In the spinning reel 100 configured as described above, if water (including seawater) enters the first cylindrical portion 62 of the rotor 6 from the front, the water that has entered the first cylindrical portion 62 is discharged from the drainage hole 7 to the outside of the first cylindrical portion 62, as indicated by the arrow in FIG. 4. Since it is thus possible to reduce or prevent the accumulation of water inside the first cylindrical portion 62, the intrusion of the water from the first cylindrical portion 62 to the interior of the reel body 2 can be reduced or prevented. In addition, since the drainage hole 7 is disposed at a boundary portion between the wall portion 61 and the first cylindrical portion 62, it is possible to reduce or prevent the accumulation of the water at the front surface portion of the wall portion 61 inside the first cylindrical portion 62. As a result, the intrusion of water from the first cylindrical portion 62 to the interior of the reel body 2 can be further reduced. In addition, by disposing the inclined portion 7a in the drainage hole 7, the water discharged from the drainage hole 7 is more easily directed to the outside along the outer peripheral portion of the second cylindrical portion 63, and the water is less likely to remain in the skirt portion 5b of the spool 5.

Other Embodiments

One embodiment of the present invention is described above, but the present invention is not limited to the above-described embodiment, and various modifications can be made without departing from the scope of the invention. Specifically, the various embodiments and modified examples described in the present Specification can be combined in any manner as required.

In the above-described embodiment, the drainage hole 7 is disposed at a boundary portion between the wall portion 61 and the first cylindrical portion 62, but the position and shape of the drainage hole 7 are not limited to the embodiment described above. It suffices if the drainage hole 7 passes from the interior to the exterior of the first cylindrical portion 62. For example, the drainage hole 7 can penetrate the intermediate portion of the first cylindrical portion 62 in the radial direction or connect the front surface portion of the wall portion 61 with the outside of the first cylindrical portion 62. Also, it suffices if there is at least one of the drainage hole 7. In addition, it is not necessary to provide the drainage hole 7 with the inclined portion 7a.

In the above-described embodiment, the first cylindrical portion 62 and the wall portion 61 are separate bodies, but the first cylindrical portion 62 and the wall portion 61 can be a single unitary member.

What is claimed is:

1. A spinning reel for casting fishing line in a forward direction, comprising:
   a reel body;
   a handle rotatably supported by the reel body;
   a spool shaft configured to move back and forth in reciprocating fashion in accordance with rotation of the handle;
   a spool including a bobbin trunk and a skirt portion disposed in a rear portion of the bobbin trunk and having a larger diameter than an external diameter of the bobbin trunk, the spool configured to integrally move with the spool shaft;
   a rotor configured to rotate relative to the reel body and having a wall portion which has a smaller diameter than an external diameter of the skirt portion and through which the spool shaft penetrates in an axial direction, the rotor further including a first cylindrical portion protruding forward from the wall portion and at least part of which overlaps the skirt portion of the spool in a radial direction, and a second cylindrical portion protruding rearward from the wall portion; and
   a drainage hole passing from an interior to an exterior of the first cylindrical portion of the rotor.

2. The spinning reel according to claim 1, wherein the drainage hole extends along a circumferential direction of the first cylindrical portion.

3. The spinning reel according to claim 1, wherein the drainage hole is disposed at a boundary portion between the wall portion and the first cylindrical portion.

4. The spinning reel according to claim 1, wherein the drainage hole has an inclined portion inclined rearward in a direction away from the spool shaft.

5. The spinning reel according to claim 4, wherein a rear end portion of the inclined portion of the drainage hole is connected to an outer peripheral portion of the second cylindrical portion.

6. A spinning reel for casting fishing line in a forward direction, comprising:
   a reel body;
   a handle rotatably supported by the reel body;
   a spool shaft configured to move back and forth in reciprocating fashion in accordance with rotation of the handle;
   a spool including a bobbin trunk and a skirt portion disposed in a rear portion of the bobbin trunk and having a larger diameter than an external diameter of the bobbin trunk, the spool configured to integrally move with the spool shaft;
   a rotor configured to rotate relative to the reel body and having a wall portion which has a smaller diameter than an external diameter of the skirt portion and through which the spool shaft penetrates in an axial direction, the rotor further including a pair of rotor arms that oppose each other on a radially outward side of the first cylindrical portion and the second cylindrical portion, a first cylindrical portion protruding forward from the wall portion and at least part of which overlaps the skirt portion of the spool in a radial direction, and a second cylindrical portion protruding rearward from the wall portion; and a drainage hole passing from an interior to an exterior of the first cylindrical portion of the rotor, the drainage hole disposed in a position so as to not overlap the pair of rotor arms.

7. The spinning reel according to claim 6, wherein the drainage hole extends along a circumferential direction of the first cylindrical portion.

8. The spinning reel according to claim 6, wherein the drainage hole is disposed at a boundary portion between the wall portion and the first cylindrical portion.

9. The spinning reel according to claim 6, wherein the drainage hole has an inclined portion inclined rearward in a direction away from the spool shaft.

\* \* \* \* \*